(12) United States Patent
Tanaka et al.

(10) Patent No.: US 9,203,177 B2
(45) Date of Patent: Dec. 1, 2015

(54) TILT LIMITING SHIELDED CONNECTOR UNIT

(71) Applicant: YAZAKI CORPORATION, Minato-ku, Tokyo (JP)

(72) Inventors: Masahiro Tanaka, Kakegawa (JP); Hajime Kato, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/276,144

(22) Filed: May 13, 2014

(65) Prior Publication Data

US 2014/0248799 A1   Sep. 4, 2014

Related U.S. Application Data

(63) Continuation of application No. PCT/JP2012/081007, filed on Nov. 22, 2012.

(30) Foreign Application Priority Data

Nov. 24, 2011   (JP) .................................. 2011-256466

(51) Int. Cl.
*H01R 13/648* (2006.01)
*H01R 13/516* (2006.01)
(Continued)

(52) U.S. Cl.
CPC .............. *H01R 13/516* (2013.01); *H01R 13/56* (2013.01); *H01R 13/648* (2013.01); *H02G 3/0487* (2013.01); *H01R 31/06* (2013.01)

(58) Field of Classification Search
CPC ... H01R 13/648; H01R 13/516; H01R 13/518

USPC ......................................... 439/607.01–607.59
See application file for complete search history.

(56) References Cited

U.S. PATENT DOCUMENTS 5,091,604 A * 2/1992 Kirma ............................... 174/2
5,921,782 A   7/1999 Yamaguchi et al.
(Continued)

FOREIGN PATENT DOCUMENTS

CN          101300155 A      11/2008
CN          201946850 U       8/2011
(Continued)

OTHER PUBLICATIONS

International Search Report dated Mar. 22, 2013 issued in International Application No. PCT/JP2012/081007 (PCT/ISA/210).
(Continued)

*Primary Examiner* — Chandrika Prasad
(74) *Attorney, Agent, or Firm* — Sughrue Mion, PLLC

(57) ABSTRACT

A shielded connector unit includes a lower shielded connector to be connected downwards to a lower positioned first instrument, an upper shielded connector to be connected sideways to a second instrument positioned above the first instrument, and a flexible conductive part made up of an electric wire which is adapted to connect the lower shielded connector to the upper shielded connector and a braid which is adapted to enclose a bare portion of the electric wire existing between a shielding shell of the lower shielded connector and a shielding shell of the upper shielded connector. The shielded connector unit further includes a hard protector that is adapted to enclose and protect the conductive part from the outside while ensuring flexibility of at least a portion of the conductive part.

8 Claims, 14 Drawing Sheets

(51) Int. Cl.
*H01R 13/56* (2006.01)
*H02G 3/04* (2006.01)
*H01R 31/06* (2006.01)

(56) References Cited

U.S. PATENT DOCUMENTS

| | | |
|---|---|---|
| 6,575,411 B1 | 6/2003 | Serizawa et al. |
| 8,997,346 B2 * | 4/2015 | Omae et al. .............. 29/876 |
| 2004/0099427 A1 | 5/2004 | Kihira |
| 2005/0215122 A1 * | 9/2005 | Nishida ................. 439/610 |
| 2006/0090921 A1 | 5/2006 | Sato et al. |
| 2006/0099851 A1 * | 5/2006 | Duarte et al. ............ 439/502 |
| 2009/0111321 A1 * | 4/2009 | Baldwin et al. ......... 439/471 |
| 2009/0140107 A1 | 6/2009 | Murayama et al. |
| 2010/0243321 A1 | 9/2010 | Adachi et al. |
| 2014/0235101 A1 * | 8/2014 | Derbogen et al. ....... 439/607.01 |

FOREIGN PATENT DOCUMENTS

| | | |
|---|---|---|
| DE | 197 28 707 A1 | 1/1998 |
| DE | 100 51 269 A1 | 6/2001 |
| JP | 2010-211935 A | 9/2010 |

OTHER PUBLICATIONS

Written Opinion dated Mar. 22, 2014 issued in International Application No. PCT/JP2012/081007 (PCT/ISA/237).

Office Action issued on Sep. 6, 2015, by the State Intellectual Property Office of P.R. China in counterpart Chinese Application No. 201280057869.9.

* cited by examiner

US 9,203,177 B2

TILT LIMITING SHIELDED CONNECTOR UNIT

CROSS REFERENCE TO RELATED APPLICATIONS

This application is a continuation of PCT application No. PCT/2012/081007, which was filed on Nov. 22, 2012 based on Japanese Patent Application (No. 2011-256466) filed on Nov. 24, 2011, the contents of which are incorporated herein by reference.

BACKGROUND OF THE INVENTION

1. Field of the Invention

The invention relates to a shielded connector unit for interconnecting instruments while shielding them and, more particularly, to a shielded connector unit in which shielded connectors at both ends are connected together by means of a conductive part made up of flexible electric wires and braids.

2. Description of the Related Art

FIGS. 13A and 13B are structural diagrams of an existing shielded connector unit, and FIG. 14 is a diagram showing a problem that occurs when a lower positioned instrument and an upper positioned instrument are connected together by use of the shielded connector unit.

The shielded connector unit 1 has one lower shielded connector 2 to be connected downward (in a direction of arrow A in FIG. 14) to a lower positioned first instrument M1, two upper shielded connectors 3 and 4 connected sideways (in a direction of arrow B shown in FIG. 14) to a second instrument M2 situated higher than the first instrument M1; and two lines of flexible conductive parts 10 made up of electric wires 8 which connect the lower shielded connector 2 to the upper shielded connectors 3 and 4 and braids 9 which enclose bare portions of the electric wires 8 existing between a shielding shell 5 of the lower shielded connector 2 and shielding shells 6 and 7 of the upper shielded connectors 3 and 4.

Suppose that, on the occasion of the lower shielded connector 2 of the shielded connector unit 1 being connected to the first instrument M1 and the upper shielded connectors 3 and 4 of the same being connected to the second instrument M2, an attempt is made to connect first; for instance, the lower shielded connector 2 to the lower positioned first instrument M1 and second the upper shielded connectors 3 and 4 to the upper positioned second instrument M2. In this scenario, since the conductive parts 10 that connect the lower shielded connector 2 to the upper shielded connectors 3 and 4 are flexible, the conductive parts 10 and the upper shielded connectors 3 and 4 might tilt in a direction of arrow C shown in FIG. 14. To prevent the risk, some countermeasures, such as manually holding down the conductive parts 10 and the upper shielded connectors 3 and 4 and supporting the same with a jig, must be taken during assembly work, which raises a poor workability problem.

Although a technique for covering such conductive parts with a protector has already been known (see; for instance, PTL 1), any techniques for solving a tilt problem of the conductive parts and the connectors due to their flexibility have never been found.

CITATION LIST

Patent Literature

[PTL 1] Japanese Patent Publication No. JP-A-2010-211935

SUMMARY OF THE INVENTION

As mentioned above, the tilt problem due to flexibility of the conductor parts that interconnect the shielded connectors has existed in the conductive parts and the shielded connectors. It has been desired to enhance workability by solving the problem.

The invention has been conceived in light of the circumstance and aims at providing a shielded connector unit that enables enhancement of workability achieved during assembly work by solving a tilt problem of conductive parts that will occur during work for connecting an upper shielded connector to a lower shielded connector.

In order to achieve the object described above, a shield structure according to the invention is characterized by the following (1) to (4).

(1) A shielded connector unit including:

a lower shielded connector to be connected downwards to a lower positioned first instrument;

an upper shielded connector to be connected sideways to a second instrument positioned above the first instrument; and a flexible conductive part made up of an electric wire which is adapted to connect the lower shielded connector to the upper shielded connector and a braid which is adapted to enclose a bare portion of the electric wire existing between a shielding shell of the lower shielded connector and a shielding shell of the upper shielded connector, further comprising:

a hard protector that is adapted to enclose and protect the conductive part from the outside while ensuring flexibility of at least a portion of the conductive part, wherein an interference part is provided at a lower portion of the protector and adapted to interfere with a support provided on the first instrument or the shielding shell of the lower shielded connector when the lower shielded connector is connected to the first instrument, thereby preventing the conductive part and the upper shielded connector from tilting in excess of a certain degree, which would otherwise be caused by flection of the conductive part protected by the protector, the interference part and the support provided on the first instrument or the shielding shell of the lower shielded connector being not interfered when the conductive part and the upper shielded connector being tilted within the angle smaller than the certain degree.

(2) The shielded connector unit according to the above (1), wherein the interference part is provided as a corner at a lower portion of a back of the protector.

(3) The shielded connector unit according to the above (1), wherein the shielding shell of the lower shielded connector is provided with, as an L-shaped wall, the support for tilting prevention purpose with which the interference part of the protector is to interfere, and the interference part of the protector is provided as a flat wall.

(4) The shielded connector unit according to any one of the above (1) to (3), wherein the upper shielded connector is provided in numbers; the plurality of conductive parts are provided while separated from each other in accordance with the number of the upper shielded connectors; the protector is provided in numbers in correspondence with each of the separated conductive parts; and a supporting piece for preventing tilting of the protector not having the interference part is provided on only a tilt prevention side of the protector having the interference part among the plurality of protectors.

In the shielded connector unit described in connection with (1), when the lower shielded connector is connected to the first instrument, the interference part provided at the lower portion of the protector interferes with the support provided on the first instrument or the shielding shell of the lower shielded connector, to thus make it possible to prevent the conductive part and the upper shielded connector from tilting in excess of a certain degree, which would otherwise be caused by flection of the conductive part protected by the protector. Therefore, this obviates a necessity to support the conductive part and the upper shielded connector by hands or with a jig in order to prevent them from tilting on the occasion of attachment of the shielded connector unit to an instrument, so that enhancement of workability can be achieved.

In relation to the shielded connector units described in connection with (2) and (3), the interference part can be structured in a simple configuration.

In the shielded connector unit described in connection with (4), even when there is a protector not having a tilt prevention interference part, the protector can be supported by the supporting piece of the protector having the tilt prevention interference part. Accordingly, tilting of all of the protectors can be prevented. Moreover, since the supporting piece is provided only on a tilt prevention side, flexibility of the conductive part to the other side can be assured, so that attachment of the respective upper shielded connectors can be independently performed. Further, when the supporting piece is not provided, the protectors might tilt one by one unless all of the protectors are provided with the interference part. However, an effect for preventing tilting of the other protector can be fulfilled by means of providing only some of the protectors with the supporting piece. Therefore, the structure of the shielded connector unit can be simplified.

According to the invention, the interference part is provided at a lower portion of the protector that protects the conductive part. When the lower shielded connector is connected to the first instrument, the interference part interferes with the support provided on the first instrument or the shielding shell of the lower shielded connector, thereby preventing the conductive part and the upper shielded connector from tilting in excess of a certain degree, which would otherwise be caused by flection of the conductive part. Consequently, this obviates a necessity to support the conductive part and the upper shielded connector by hands or with a jig in order to prevent them from tilting on the occasion of attachment of the shielded connector unit to an instrument. Thus, workability can be enhanced.

BRIEF DESCRIPTION OF THE DRAWINGS

FIGS. 13A and 13B are structural diagrams of an existing shielded connector unit, wherein FIG. 13A is a perspective view and FIG. 13B is a side elevation.

DETAILED DESCRIPTION OF THE EXEMPLARY EMBODIMENTS

Embodiments of the invention are hereunder described by use of the drawings.

Figure 1:
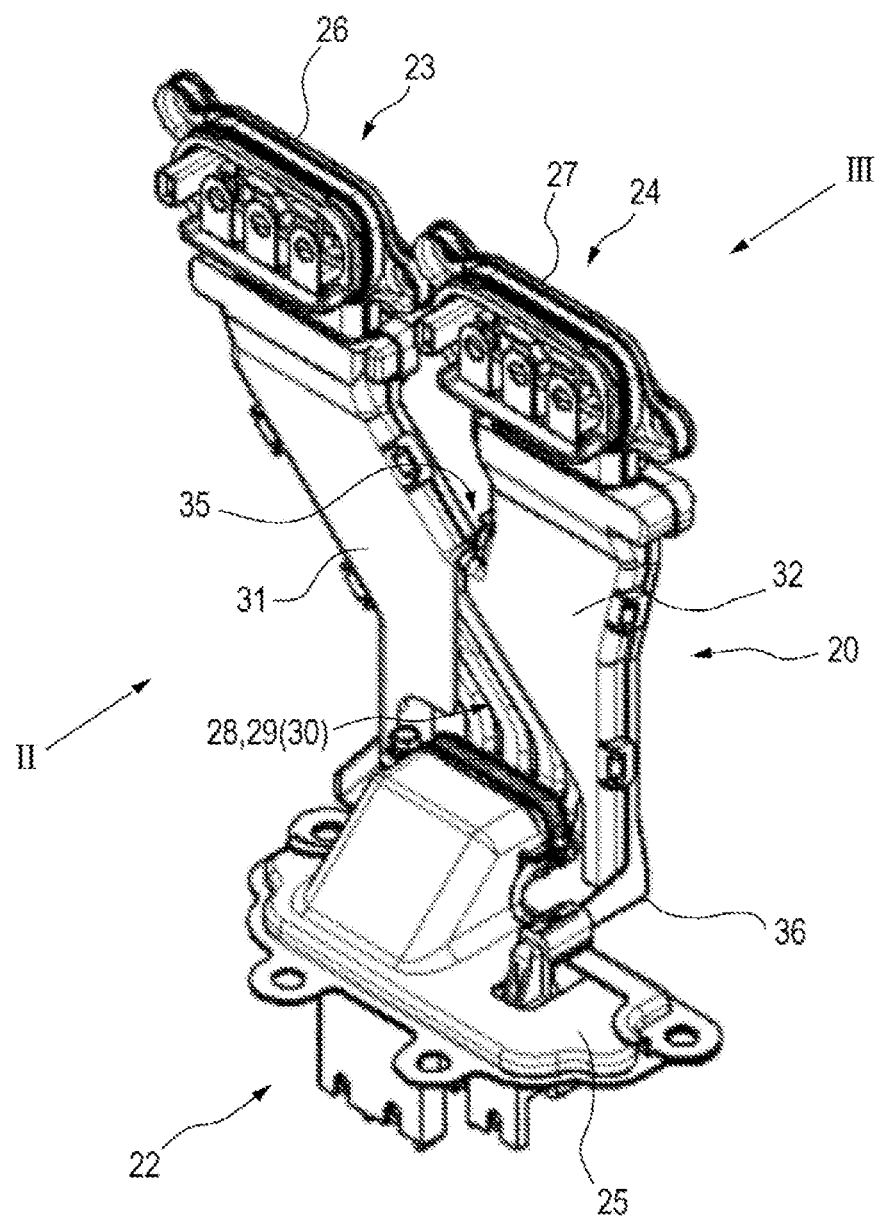
FIG. 1 is a perspective view showing a structure of a shielded connector unit of a first embodiment of the invention.
Figure 2:
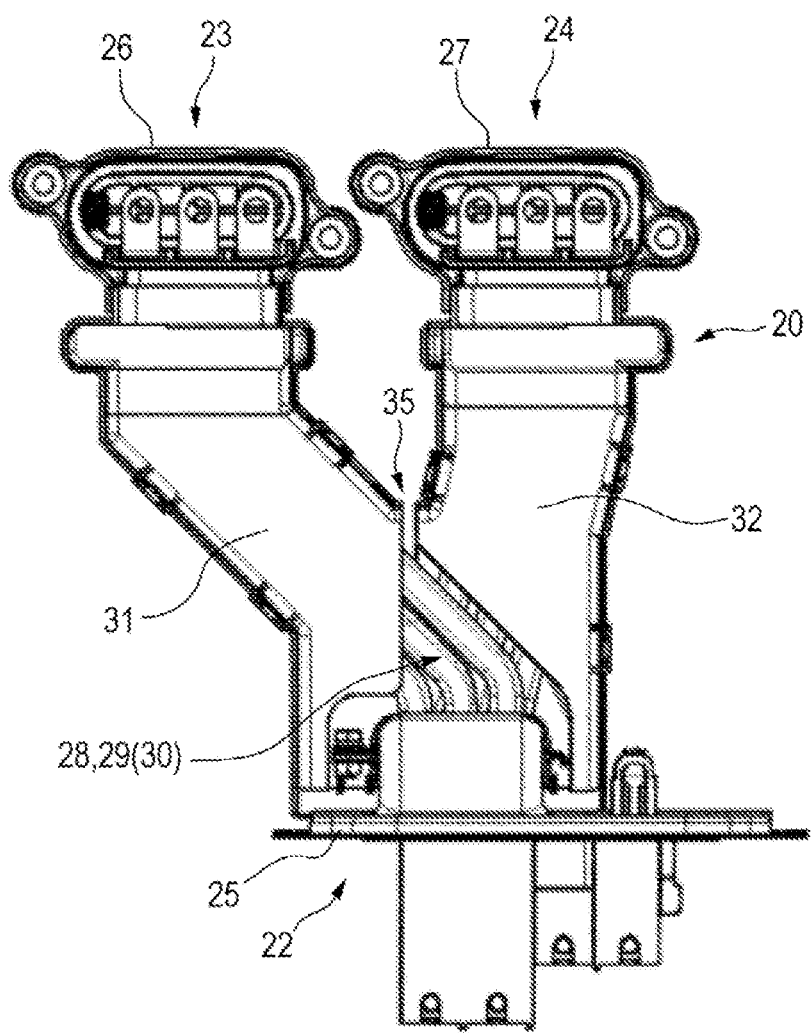
FIG. 2 is a diagram obtained when the shielded connector unit is viewed in the direction of arrow II shown in FIG. 1.
Figure 3:
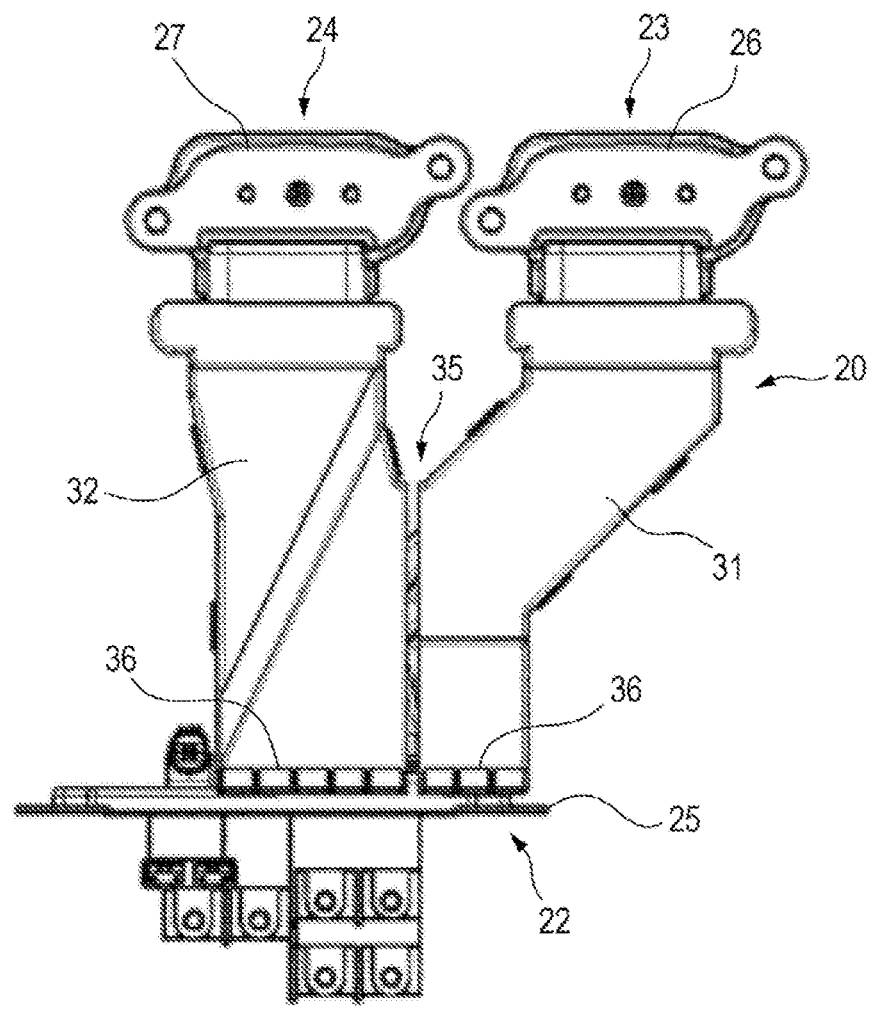
FIG. 3 is a diagram obtained when the shielded connector unit is viewed in the direction of arrow III shown in FIG. 1.
Figure 4A:
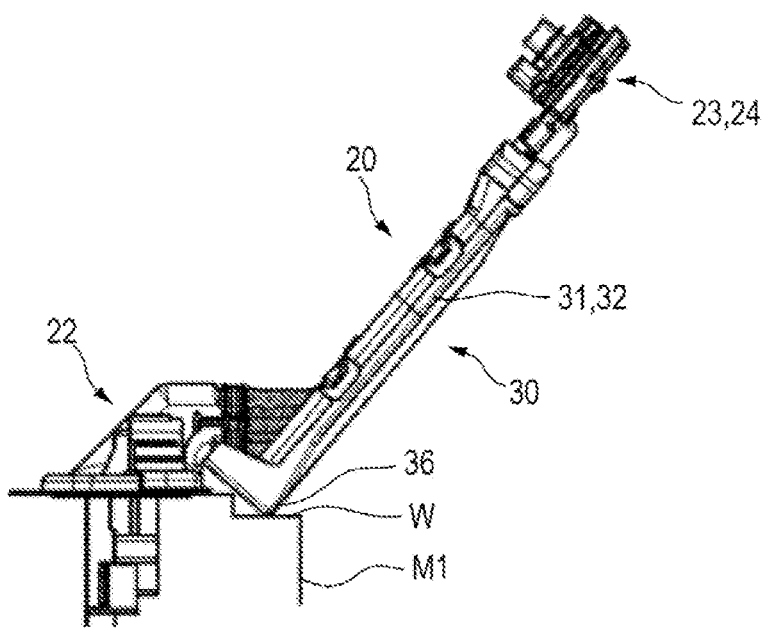
FIG. 4A is a side elevation showing that a lower shielded connector of the shielded connector unit of the embodiment is first connected to a first instrument.
Figure 4B:
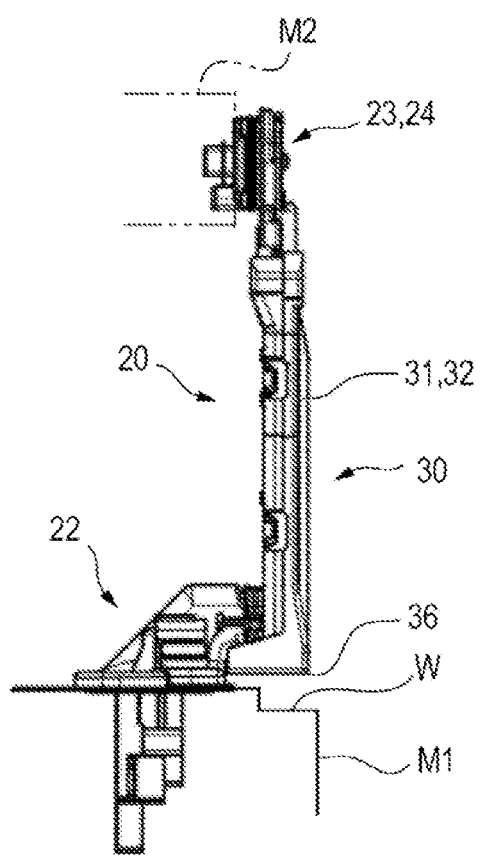
FIG. 4B is a side elevation showing that upper shielded connectors are subsequently connected to a second instrument.

FIGS. 1 through 3 and FIGS. 4A and 4B are diagrams showing a structure of a shielded connector unit of a first embodiment. FIG. 1 is a perspective view; FIG. 2 is a diagram obtained when the shielded connector unit is viewed in the direction of arrow II shown in FIG. 1; FIG. 3 is a diagram obtained when the shielded connector unit is viewed in the direction of arrow III shown in FIG. 1; FIG. 4A is a side elevation showing that a lower shielded connector of the shielded connector unit is first connected to a first instrument; and FIG. 4B is a side elevation showing that upper shielded connectors are subsequently connected to a second instrument.

As shown in FIGS. 1 through 3 and FIGS. 4A and 4B, a shielded connector unit 20 of a first embodiment has a lower shielded connector 22 connected downwardly to a lower positioned first instrument M1; upper shielded connectors 23 and 24 to be connected sideways to a second instrument M2 positioned above the first instrument M1; flexible conductive parts 30 made up of electric wires 28 which connect the lower shielded connector 22 to the upper shielded connectors 23 and 24 and braids 29 which enclose bare portions of the electric wires 28 existing between a shielding shell 25 of the lower shielded connector 22 and shielding shells 26 and 27 of the upper shielded connectors 23 and 24; and protectors 31 and 32 that are made from a hard resin and enclose and protect the conductive parts 30 from the outside while ensuring flexibility of at least portions of the conductive parts 30.

The upper shielded connectors 23 and 24 are provided in the number of two. The two lines of conductive parts 30 are separated by means of a branch 35 in accordance with the number of the upper shielded connectors 23 and 24. The two discrete protectors 31 and 32 are provided for the separated conductive parts 30, respectively. Each of the protectors 31 and 32 is split into two halves; namely, a front half and a back half. The halves are fitted together, whereby the tubular protectors 31 and 32 are made.

An interference part 36 is provided at lower portions of rear surfaces of the respective protectors 31 and 32. When the lower shielded connector 22 is connected to the first instrument M1, the interference part 36 interferes with a support W disposed on the first instrument M1, thereby preventing the conductive parts 30 and the upper shielded connectors 23 and 24 from tilting to the back in excess of a certain degree, which would otherwise be caused by flection of the conductive parts 30 protected by the protectors 31 and 32. The interference part 36 employed here is provided as a corner.

As shown in FIG. 4A, when the lower shielded connector 22 of the shielded connector unit 20 is first connected to the first instrument M1, the interference part 36 disposed at the lower portions of the protectors 31 and 32 interferes with the support W provided on the first instrument M1, so that the conductive parts 30 and the upper shielded connectors 23 and 24 can be prevented from tilting in excess of a certain degree, which would otherwise be caused by flection of the conductive parts 30 protected by the protectors 31 and 32. Consequently, this obviates a necessity to support the conductive parts 30 and the upper shielded connectors 23 and 24 by hands or with a jig in order to prevent them from tilting until the remaining upper shielded connectors 23 and 24 are connected to the second instrument M2 as shown in FIG. 4B, so that enhancement of workability can be achieved.

Figure 5:
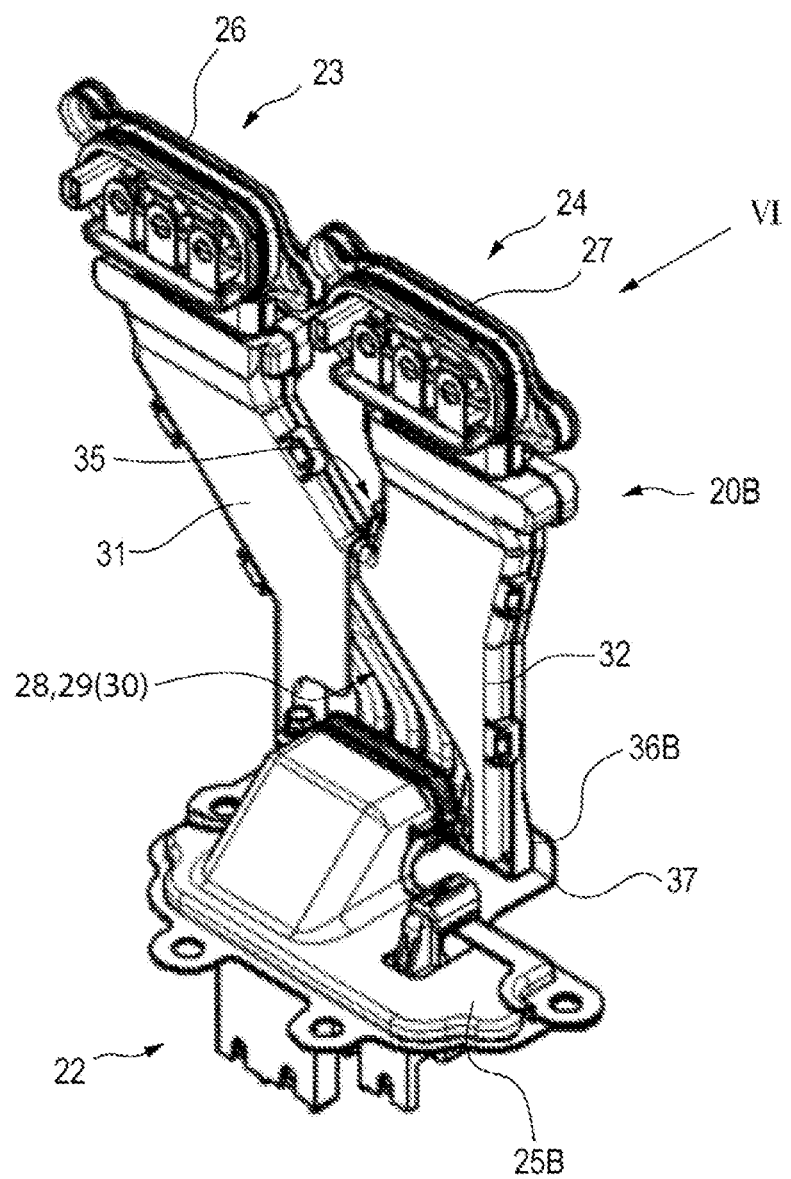
FIG. 5 is a perspective view showing a structure of a shielded connector unit of a second embodiment of the invention.
Figure 6:
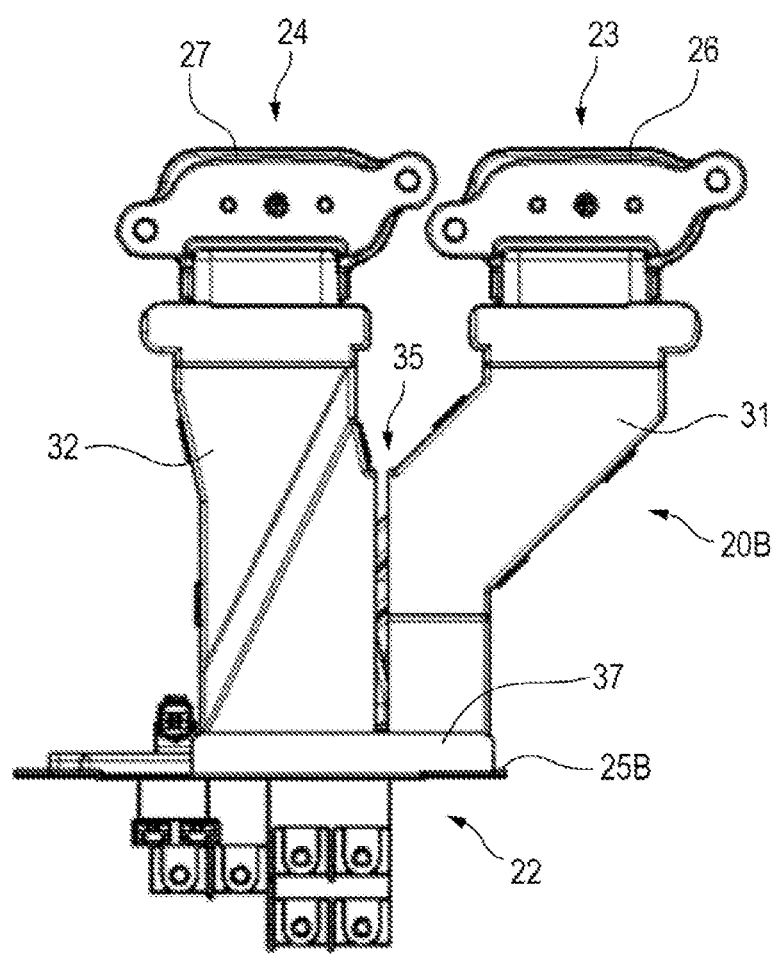
FIG. 6 is a diagram obtained when the shielded connector unit is viewed in the direction of arrow VI shown in FIG. 5.
Figure 7A:
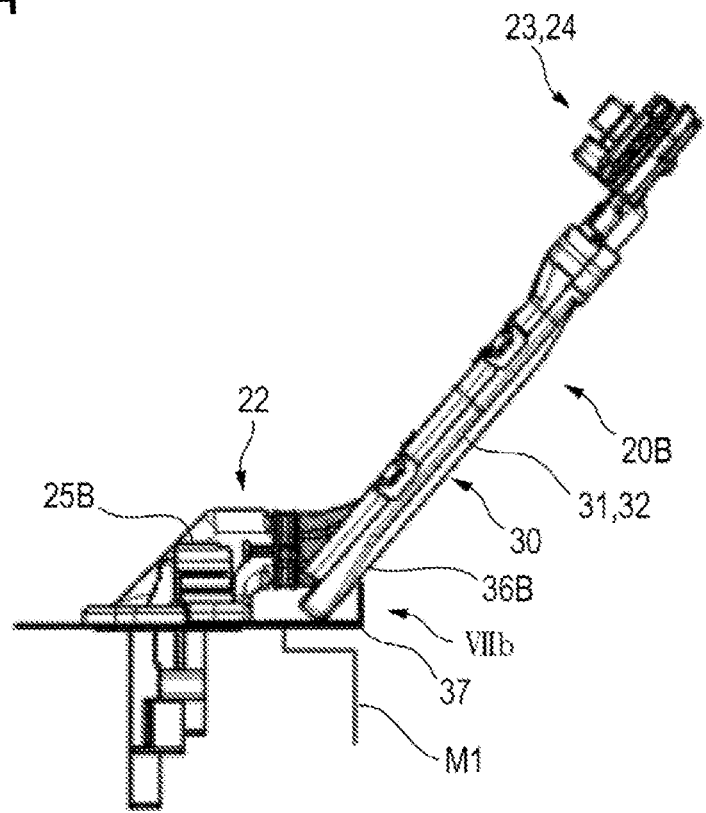
FIG. 7A is a side elevation showing that the lower shielded connector of the shielded connector unit of the embodiment is first connected to the first instrument.
Figure 7B:
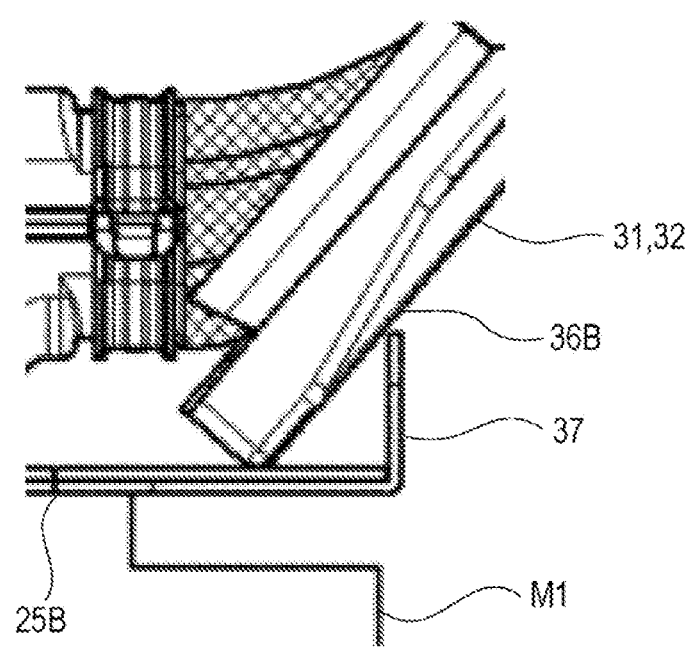
FIG. 7B is an enlarged view of the shielded connector when viewed in the direction of arrow VIIb shown in FIG. 7A.
Figure 8:
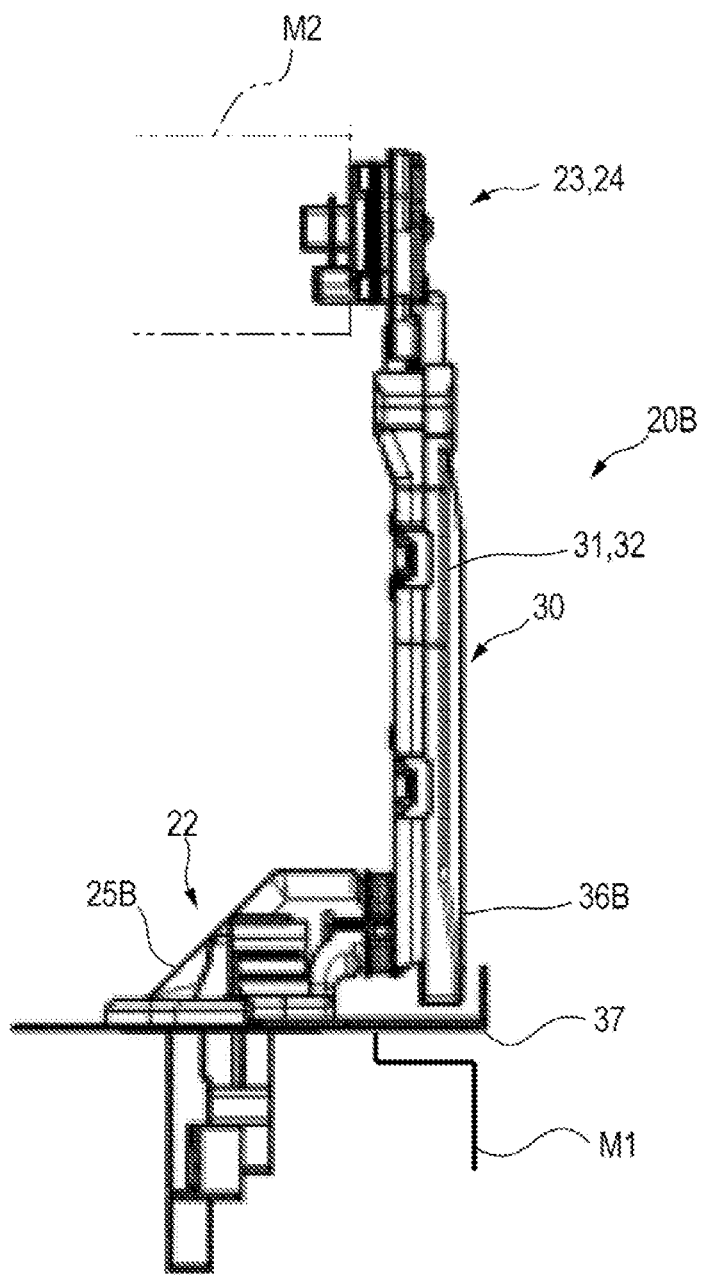
FIG. 8 is a side elevation showing that the upper shielded connectors are connected to the second instrument subsequently to the state shown in FIGS. 7A and 7B.

FIG. 5 is a perspective view showing a structure of a shielded connector unit of a second embodiment; FIG. 6 is a diagram obtained when the shielded connector unit is viewed in the direction of arrow VI shown in FIG. 5; FIG. 7A is a side elevation showing that the lower shielded connector of the shielded connector unit of the embodiment is first connected to the first instrument; FIG. 7B is an enlarged view of the shielded connector when viewed in the direction of arrow VIIb shown in FIG. 7A; and FIG. 8 is a side elevation showing that the upper shielded connectors are connected to the second instrument subsequently to the state shown in FIGS. 7A and 7B. Throughout the drawings, the constituent elements that are identical with their counterparts described in connection with the first embodiment are assigned the same reference numerals, and their repeated explanations are omitted.

The first embodiment has described the case where the interference part 36 interferes with the support W provided on the first instrument M1. In a shielded connector unit 20B of the second embodiment, a tilt prevention support 37 with which an interference part 36B of the protectors 31 and 32 interferes is provided on a shielding shell 25B of the lower shielded connector 22. In this case, the support 37 is provided in the form of an L-shaped wall, whilst the interference part 36B on the protectors 31 and 32 is provided in the form of a simple flat wall.

When the lower shielded connector 22 of the shielded connector unit 20B is first connected to the first instrument M1 as shown in FIGS. 7A and 7B, the interference part 36B provided at lower portions of the protectors 31 and 32 interferes with the support 37 provided on the shielding shell 25B of the lower shielded connector 22, thereby preventing the conductive parts 30 and the upper shielded connectors 23 and 24 from tilting in excess of a certain degree, which would otherwise be caused by flection of the conductive parts 30 protected by the protectors 31 and 32. As a consequence, this obviates a necessity to support the conductive parts 30 and the upper shielded connectors 23 and 24 by hands or with the jig in order to prevent them from tilting until the remaining upper shielded connectors 23 and 24 are connected to the second instrument M2 as shown in FIG. 8, so that enhancement of workability can be achieved.

Figure 9:
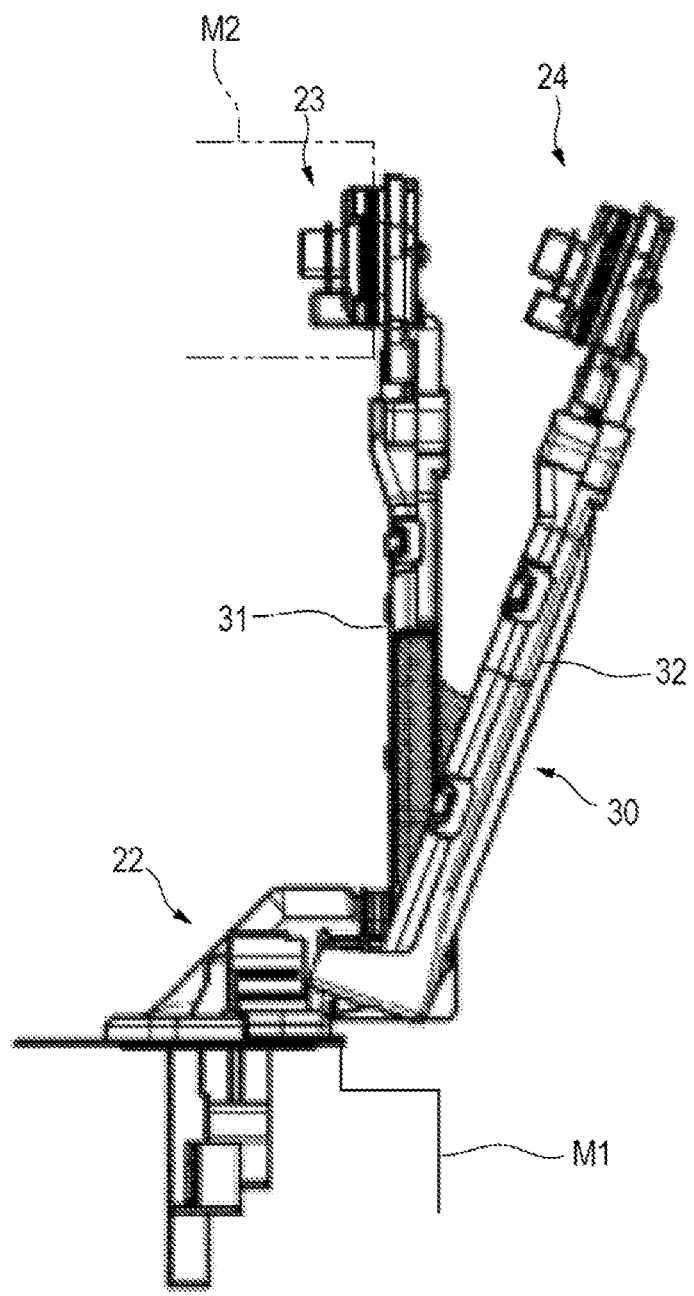
FIG. 9 is a side elevation for explaining a problem that arises when conductive parts to be connected respectively to the two upper shielded connectors are separated into lines and when protectors are also separated correspondingly.

Incidentally, when the protectors 31 and 32 are provided as discrete components while separated from each other, the respective upper shielded connectors 23 and 24 can be independently actuated. If the interference parts 36 and 36B are not provided respectively for the protectors 31 and 32, the interference parts will fail to prevent tilting of the shielded connectors as shown in FIG. 9. In this case, there arises a necessity to support the protectors 31 and 32 one by one by hands or with a jig, which will deteriorate workability.

Figure 10:
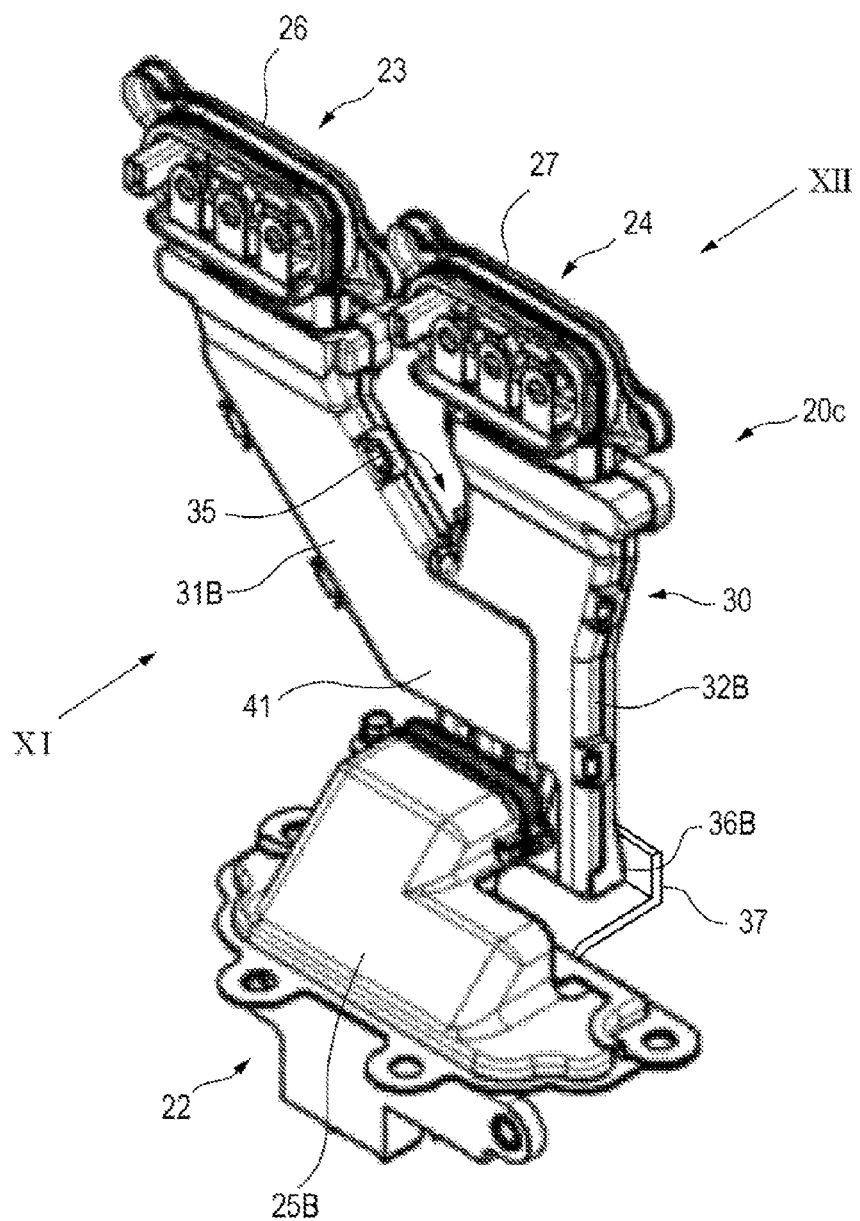
FIG. 10 is a perspective view showing a structure of a shielded connector unit of a third embodiment of the invention that has solved the drawback shown in FIG. 9.
Figure 11:
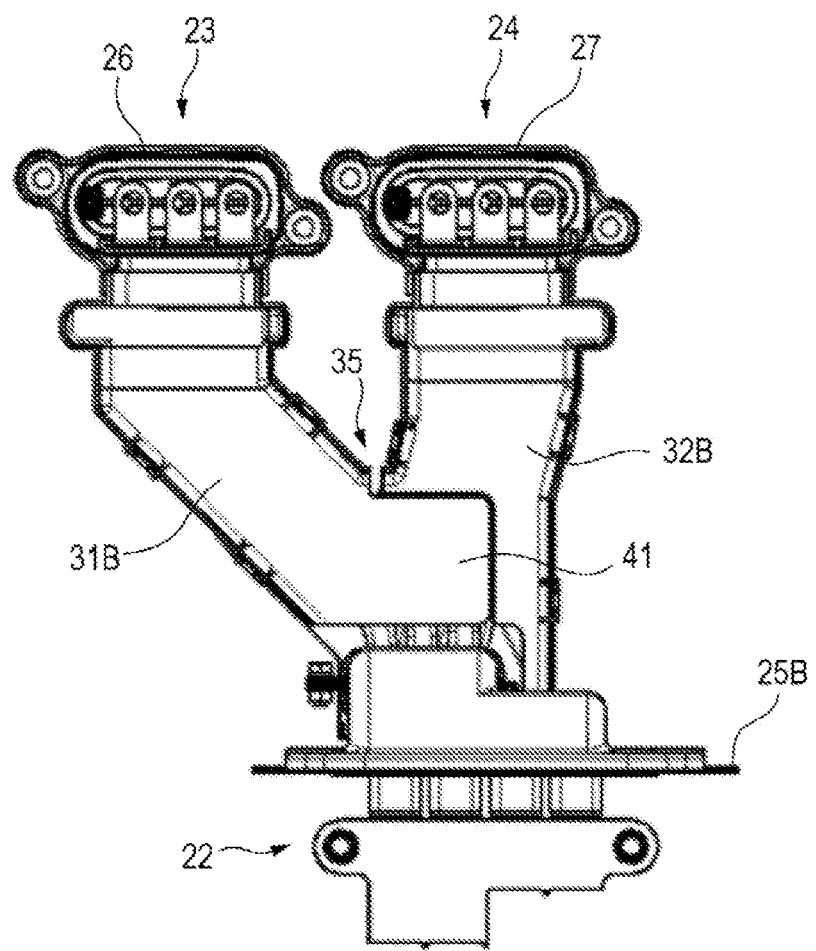
FIG. 11 is a diagram obtained when the shielded connector unit is viewed in the direction of arrow XI shown in FIG. 10.
Figure 12:
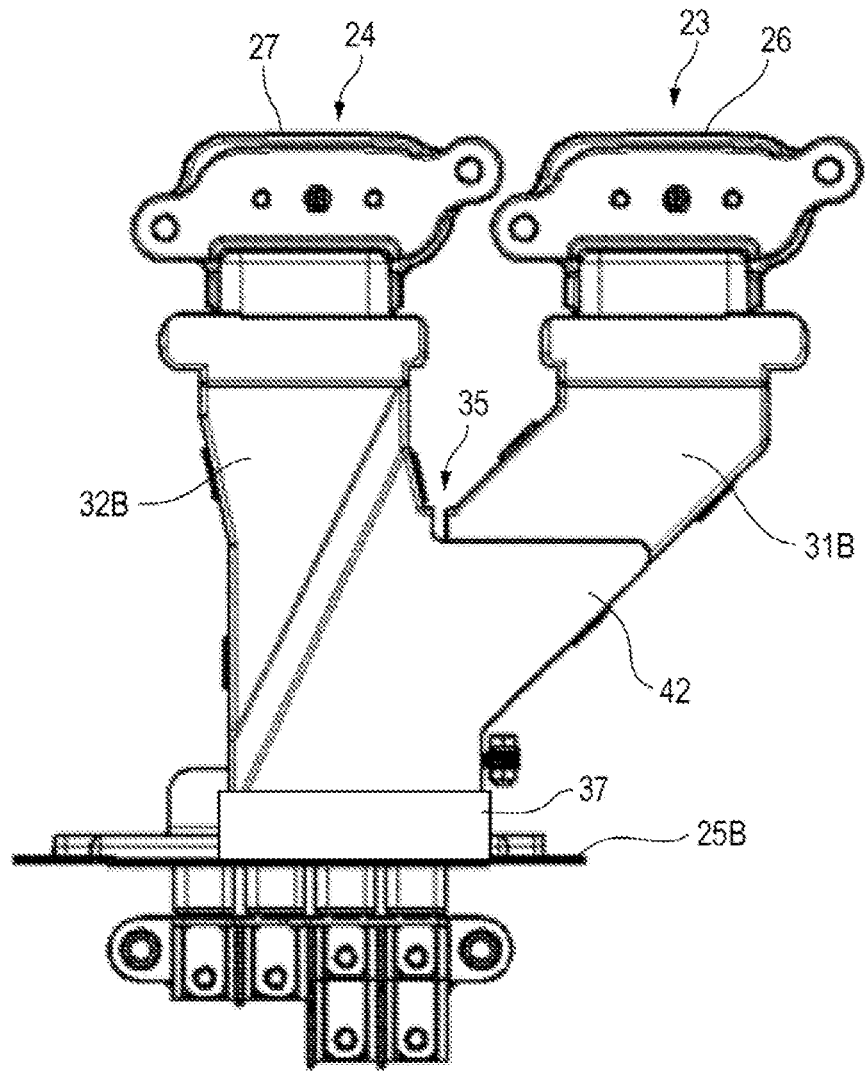
FIG. 12 is a diagram obtained when the shielded connector unit is viewed in the direction of arrow direction XII shown in FIG. 10.
Figure 13B:
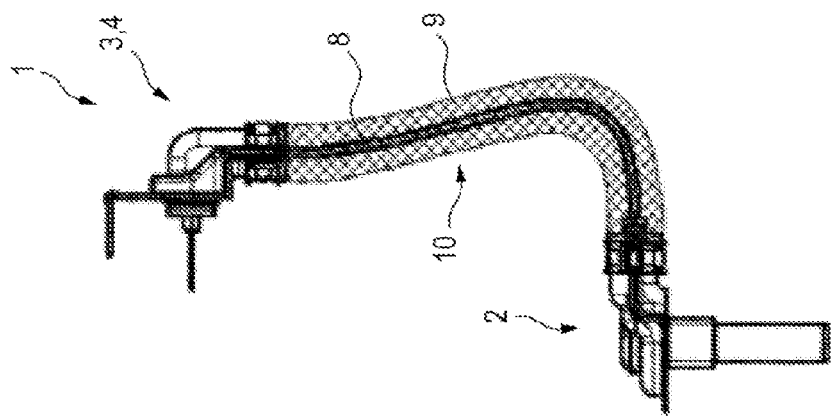
Figure 13A:
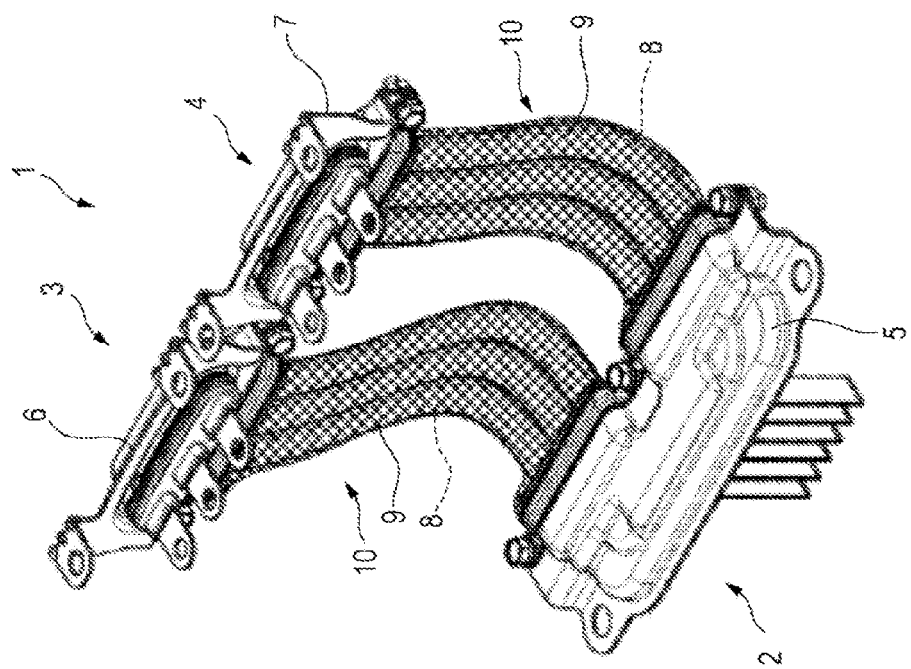
Figure 14:
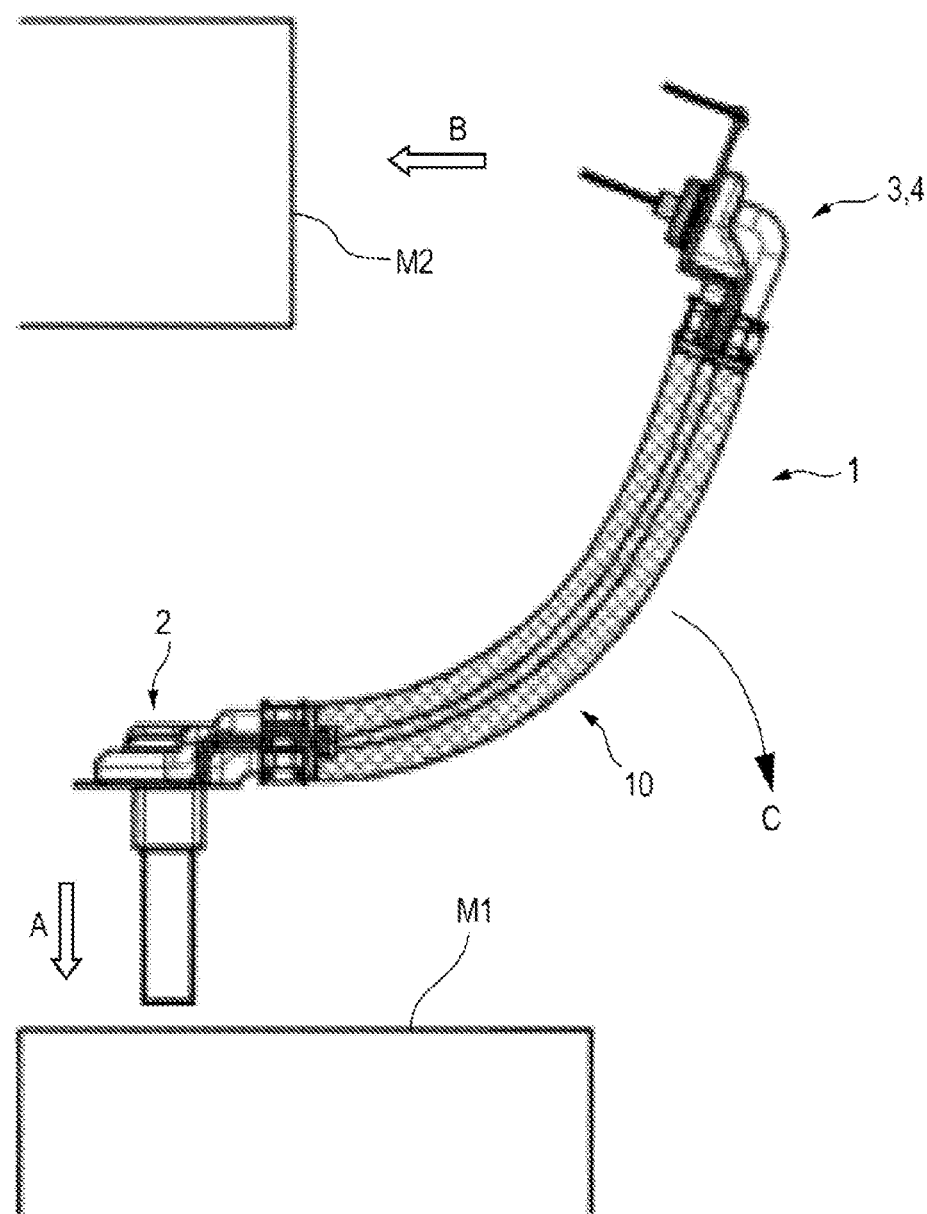
FIG. 14 is a side elevation for explaining a problem of the existing shielded connector unit.

For these reasons, a shielded connector unit 20C of a third embodiment shown in FIGS. 10 to 12 is made able to solve the problem. Specifically, the upper shielded connectors 23 and 24 are provided in the number of two, and two lines of conductive parts (not illustrated in FIGS. 10 through 12) are separated by the branch 35 according to the number of the upper shielded connectors 23 and 24. Two discrete protectors 31B and 32B are provided respectively for the separated conductive parts. Each of the protectors 31B and 32B is split into two halves; namely, a front half and a back half. The halves are fitted together, whereby the tubular protectors 31B and 32B are made. As shown in FIG. 12, a supporting piece 42 for hampering a tilt of the protector 31B not having the interference part 36B is provided only on a tilt prevention side (a back side) of the protector 32B having the interference part 36B among the plurality of protectors 31B and 32B. In other respective, the third embodiment is structurally analogous to the second embodiment. Although a supporting piece 41 is provided also on the front side of the protector 31B, the supporting piece 41 is intended to prevent the protector 32B from independently tilting forwards, which is different from the tilt problem that has been described as an issue in the above.

In the shielded connector unit 20C of the third embodiment, even when the protector 31B does not have any tilt prevention interference part, the protector 31B can be supported by the supporting piece 42 of the protector 32B having the tilt prevention interference part 36B. Accordingly, tilting of all of the protectors 31B and 32B can be prevented. Moreover, since the supporting piece 42 is provided only on the tilt prevention side, flexibility of the conductive parts toward the other side can be assured. Hence, attachment of the upper shielded connectors 23 and 24 can be performed independently. Furthermore, when the supporting piece 42 is not provided, the protectors 31B and 32B might tilt one from another to the back unless all of the protectors 31B and 32B are provided with the interference part 36B. However, preventing the other protector 31B tilting can be achieved by means of only providing the protector 32B, which is a part of the protectors, with the supporting piece 42. Hence, the structure of the shielded connector unit can be simplified.

The invention is not limited to the foregoing embodiments and is susceptible to modifications, improvements, and others, as needed. In addition, materials, shapes, dimensions, the number, and locations of the constituent elements described in connection with the embodiments are arbitrary and not restricted, so long as the invention can be accomplished.

The present invention is useful for providing a shielded connector unit that enables enhancement of workability achieved during assembly work by solving a tilt problem of conductive parts that will occur during work for connecting an upper shielded connector to a lower shielded connector.

What is claimed is:

1. A shielded connector unit including:
   a lower shielded connector to be connected downwards to a lower positioned first instrument;
   an upper shielded connector to be connected sideways to a second instrument positioned above the first instrument; and
   a flexible conductive part comprising an electric wire which is configured to connect the lower shielded connector to the upper shielded connector and a braid which is configured to enclose a bare portion of the electric wire existing between a shielding shell of the lower shielded connector and a shielding shell of the upper shielded connector, further comprising:

a protector that is configured to enclose and protect the conductive part from the outside while ensuring flexibility of at least a portion of the conductive part, wherein an interference part is provided at a lower portion of the protector and configured to interfere with a support provided on the first instrument or the shielding shell of the lower shielded connector when the lower shielded connector is connected to the first instrument, thereby preventing the conductive part and the upper shielded connector from tilting in excess of a certain degree, which would otherwise be caused by flection of the conductive part protected by the protector, the interference part and the support provided on the first instrument or the shielding shell of the lower shielded connector being not interfered when the conductive part and the upper shielded connector being tilted within an angle smaller than the certain degree.

2. The shielded connector unit according to claim 1, wherein the interference part is a corner of a lower portion of a back of the protector.

3. The shielded connector unit according to claim 1, wherein the shielding shell of the lower shielded connector is provided with, as an L-shaped wall, the support for tilting prevention purpose with which the interference part of the protector is to interfere, and the interference part of the protector is provided as a flat wall.

4. The shielded connector unit according to claim 1, wherein the upper shielded connector comprises a plurality of upper shielded connectors; the plurality of conductive parts are provided separated from each other in accordance with the plurality of upper shielded connectors; the protector comprising a plurality of protectors corresponding with the plurality of upper shielded connectors; and a supporting piece for preventing tilting of the protector not having the interference part is provided on only a tilt prevention side of the protector having the interference part among the plurality of protectors.

5. The shielded connector unit according to claim 1, wherein the interference part is offset from a centerline of the lower shielded connector.

6. The shielded connector unit according to claim 1, wherein the interference part is configured to interfere with a support provided on the first instrument.

7. The shielded connector unit according to claim 1,
wherein the interference part is configured to interfere with a tilt prevention support of the shielding shell of the lower shielded connector, and
wherein the tilt prevention support comprises a wall extending orthogonal to an axis of connection of the lower shielded connector, the wall being configured to provide an outer limit on a range of tilt of the conductive part and the upper shielded connector.

8. The shielded connector unit according to claim 1,
wherein the protector comprises two halves, a front half and a back half.

* * * * *